United States Patent
Lee

(10) Patent No.: US 12,298,179 B2
(45) Date of Patent: May 13, 2025

(54) DEVICE AND METHOD FOR INSPECTING OPTICAL POWER MEASUREMENT OF LIGHT EMITTER AND COMPUTER-READABLE RECORDING MEDIUM

(71) Applicant: GRAMM INC., Middletown, DE (US)

(72) Inventor: Jisoo Lee, Middletown, DE (US)

(73) Assignee: Gramm Inc., Middletown, DE (US)

( * ) Notice: Subject to any disclaimer, the term of this patent is extended or adjusted under 35 U.S.C. 154(b) by 257 days.

(21) Appl. No.: 17/815,699

(22) Filed: Jul. 28, 2022

(65) Prior Publication Data

US 2024/0035883 A1    Feb. 1, 2024

(51) Int. Cl.
| | |
|---|---|
| *G01J 1/42* | (2006.01) |
| *G01J 1/04* | (2006.01) |
| *G01J 1/58* | (2006.01) |
| *H05B 47/20* | (2020.01) |

(52) U.S. Cl.
CPC .......... *G01J 1/4257* (2013.01); *G01J 1/0407* (2013.01); *G01J 1/58* (2013.01); *H05B 47/20* (2020.01); *G01J 2001/0481* (2013.01)

(58) Field of Classification Search
CPC .......... G01J 1/4257; G01J 1/0407; G01J 1/58; G01J 2001/0481; G01J 1/10; G01J 2001/4252; G01J 2001/4247; H05B 47/20
See application file for complete search history.

(56) References Cited

U.S. PATENT DOCUMENTS

| | | | |
|---|---|---|---|
| 5,247,167 A * | 9/1993 | Bargerhuff | G11B 7/126 |
| 2002/0186035 A1* | 12/2002 | Inoshita | G01R 31/3004 324/762.02 |
| 2005/0190422 A1* | 9/2005 | Sakai | G02B 26/0808 359/212.2 |
| 2012/0197599 A1* | 8/2012 | Seibel, II | G01J 3/0251 702/189 |
| 2021/0396575 A1* | 12/2021 | Häring | G01J 1/1626 |

* cited by examiner

*Primary Examiner* — Tarifur R Chowdhury
*Assistant Examiner* — Akbar H. Rizvi
(74) *Attorney, Agent, or Firm* — Saliwanchik, Lloyd & Eisenschenk

(57) ABSTRACT

Disclosed is a device for inspecting optical power measurement of a light emitter, the device including: a reference light emitter; a measurer configured to measure optical power by receiving light emitted from one of the reference light emitter and a plurality of inspection target light emitters, the measurer including an integrating sphere, a photodiode detector, and a photocurrent or photovoltage measurement device; and a controller configured to calculate a first average of optical power of the plurality of inspection target light emitters by measuring first optical power of a first inspection target light emitter among the plurality of inspection target light emitters, and generate an alarm to stop using the measurer when a difference between the first average and a second optical power of the reference light emitter exceeds a first threshold. Thus, the inspection is more accurately and reliably carried out.

11 Claims, 3 Drawing Sheets

DEVICE AND METHOD FOR INSPECTING OPTICAL POWER MEASUREMENT OF LIGHT EMITTER AND COMPUTER-READABLE RECORDING MEDIUM

BACKGROUND OF THE INVENTION

(a) Field of the Invention

The disclosure relates to a device and method for inspecting optical power measurement of a light emitter, and more particularly to a device and method for inspecting optical power measurement of a light emitter, which are more accurate and reliable.

(b) Description of the Related Art

Usually, manufacturers of lighting or light emitting devices (hereinafter referred to as light emitters) perform total inspection for the light emitters in a manufacturing stage to improve quality while reducing losses due to defects in the finished product.

In general, a method of evaluating the light emitter is by measuring the luminous flux or luminance intensity of the light emitter. In this case, the luminous flux refers to the total amount of light emitted from a light source and is measured in units of lumen. The luminance intensity refers to the intensity of light illuminating in a specific direction, and is measured in units of candela (cd).

Here, the concept of luminous flux corresponds to radiant flux measured in units of watt. The radiant flux refers to energy carried by electromagnetic waves per unit time, and may correspond to optical power (hereinafter referred to as optical power) measured by an optical power meter.

Meanwhile, a gaze tracker, which is used as an input device in human-computer interaction and product design and increasingly used in rehabilitation and support, is based on gaze tracking technology that identifies a position of eyeball of a subject based on information about infrared light emitted from an infrared element and reflected from the eyeball of the subject. In other words, the infrared light emitted from the infrared element is essential to track the gaze.

Therefore, in particular, it is more important than anything else whether the light emitter employable in the gaze tracker is safe for human eyes. For example, the optical power of the light emitter exceeding a reference level may be harmful or even fatal to the eyes, and therefore it should be accurately measured in the manufacturing stage whether the optical power of the light emitter meets the safety standards for the eye protection.

To this end, a device for measuring the optical power of the light emitter, which is used for the total inspection in the manufacturing stage of the light emitter, should also be guaranteed and reliable in the accuracy of measurement.

SUMMARY OF THE INVENTION

Accordingly, an aspect of the disclosure is to provide a more accurate and reliable device and method for inspecting optical power measurement of a light emitter.

The problems to be solved by the disclosure are not limited to those mentioned above, and other unmentioned problems will become apparent to a person skilled in the art by the following descriptions.

A first aspect of the disclosure may be achieved by a device for inspecting optical power measurement of a light emitter, the device including: a reference light emitter; a measurer configured to measure optical power by receiving light emitted from one of the reference light emitter and a plurality of inspection target light emitters, the measurer including an integrating sphere, a photodiode detector, and a photocurrent or photovoltage measurement device; and a controller configured to calculate a first average of optical power of the plurality of inspection target light emitters by measuring first optical power of a first inspection target light emitter among the plurality of inspection target light emitters, and generate an alarm to stop using the measurer when a difference between the first average and a second optical power of the reference light emitter exceeds a first threshold.

In this case, the second optical power of the reference light emitter may be periodically measured and stored while the plurality of inspection target light emitters are measured for their optical power.

Here, the plurality of inspection target light emitters may include a laser, a light emitting diode (LED) or a halogen lamp.

Further, the controller may be configured to calculate a first standard deviation of optical power of the plurality of inspection target light emitters by measuring first optical power of a first inspection target light emitter among the plurality of inspection target light emitters, and generate an alarm to stop using the measurer when the first standard deviation exceeds a second threshold.

Further, when the difference between the first average and the second optical power of the reference light emitter does not exceed the first threshold or when the first standard deviation does not exceed the second threshold, the first average and the first standard deviation are stored in a nonvolatile memory.

A second aspect of the disclosure may be achieved by a method of inspecting optical power measurement of a light emitter, implementable in a device for inspecting optical power measurement of the light emitter, the method including the steps of:
 (a) by a measurer, defining optical power of a reference light emitter, i.e., second optical power;
 (b) by the measurer, measuring first optical power of a first inspection target light emitter among a plurality of inspection target light emitters; and
 (c) calculating a first average of optical power of the plurality of inspection target light emitters, and generating an alarm to stop using the measurer when a difference between the first average and the second optical power of the reference light emitter exceeds a first threshold.

In this case, the second optical power of the reference light emitter may be periodically measured and stored while the plurality of inspection target light emitters are measured for their optical power.

Here, the plurality of inspection target light emitters may include a laser, an LED or a halogen lamp.

Further, the method may further include (d) calculating a first standard deviation of optical power of the plurality of inspection target light emitters, and generating an alarm to stop using the measurer when the first standard deviation exceeds a second threshold.

Further, the method may further include storing the first average and the first standard deviation in a nonvolatile memory when the difference between the first average and the second optical power of the reference light emitter does not exceed the first threshold or when the first standard deviation does not exceed the second threshold.

Further, the measurer may include an integrating sphere, a photodiode detector, and a photocurrent or photovoltage measurement device, or may include the integrating sphere and a spectroradiometer, or may include the integrating sphere, a spectroradiometer, the photodiode detector, and the photocurrent or photovoltage measurement device, and the step of (a) by a measurer, defining the optical power of the reference light emitter, i.e., the second optical power, by a measurer, may include measuring the optical power of the reference light emitter by disposing the reference light emitter in an input port of the integrating sphere.

A third aspect of the disclosure may be achieved by a computer readable recording medium recorded with a program to perform the foregoing method.

In addition, a fourth aspect of the disclosure may be achieved by a computer program stored in a medium to perform the method, based on combination with hardware.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Below, exemplary embodiments of the disclosure will be described in detail with reference to the accompanying drawings. However, the disclosure is not limited or restricted to the exemplary embodiments. Throughout the accompanying drawings, like numerals refer to like elements.

Although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the disclosure. The terminology used herein is for the purpose of describing particular embodiments only, and is not intended to limit the disclosure. Singular forms are intended to include plural forms as well, unless the context clearly indicates otherwise.

As the terminology used in the disclosure, general terms indicating the functions of the disclosure and currently used as widely as possible are selected. However, these terms may be varied depending on intension of those skilled in the art, the precedents, the advent of new technology, etc. In particular, an applicant may voluntarily choose terms, and in this case the meaning of these terms will be explained in detail in the corresponding description of the disclosure. Therefore, the terminology used in the disclosure should be defined based on not mere naming but its meaning and description made throughout the disclosure.

Throughout the disclosure, when a certain part includes a certain element, the term "include" is intended to not exclude another element but include one or more additional elements unless otherwise specified.

Figure 1:
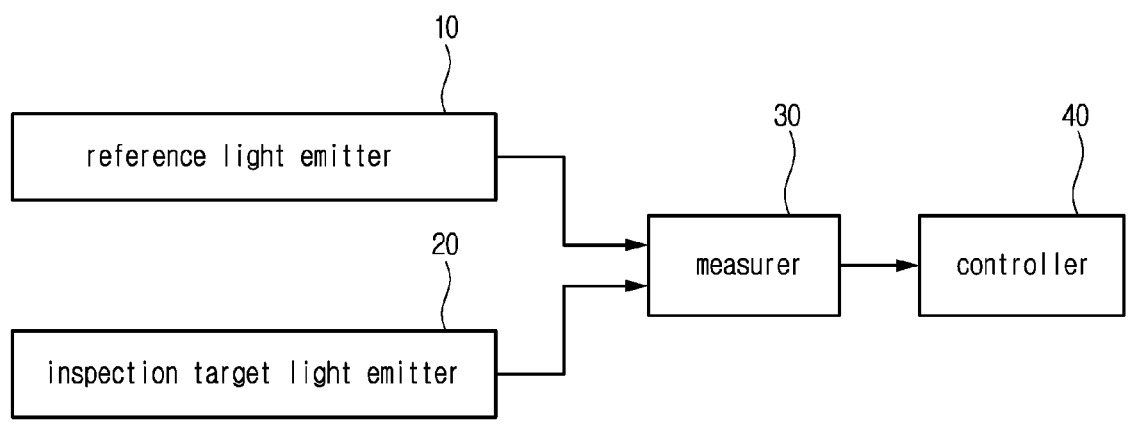
FIG. 1 is a block diagram of a device for inspecting an optical power measurement of a light emitter according to the disclosure.

FIG. 1 is a block diagram of a device for inspecting an optical power measurement of a light emitter according to the disclosure. Referring to FIG. 1, the device for inspecting the optical power measurement of the light emitter according to the disclosure includes a reference light emitter 10; a measurer 30 configured to measure the optical power of the reference light emitter 10 or an inspection target light emitter 20; and a controller 40 configured to generate an alarm to stop using the measurer 30 according to measurement results of the measurer 30.

The reference light emitter 10 refers to a light emitter, the optical power of which is periodically measured while the optical power of the inspection target light emitter is inspected in the manufacturing stage, and may include any light emitter as long as its optical power is accurately repeated.

The inspection target light emitter 20 refers to a light emitter, the optical power of which is inspected by the measurer 30 in the manufacturing, and may include a laser, light emitting diode (LED) or a halogen lamp, the optical power of which should meet the requirements of the laser safety class, according to the disclosure. In particular, the inspection target light emitters according to the disclosure may include an infrared element that uses a frequency of 940 nm allowable in a gaze tracker.

The measurer 30 may for example refer to an optical power meter, and is configured to measure optical power by receiving light emitted from one of the reference light emitter 10 and the plurality of inspection target light emitters 20.

Figure 2:
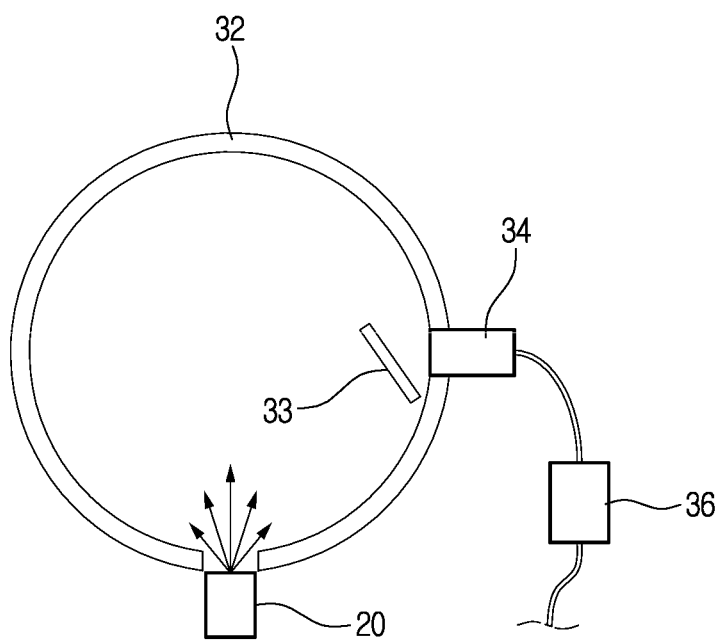
FIG. 2 illustrates an embodiment of a device for inspecting an optical power measurement of a light emitter according to the disclosure.
Figure 3:
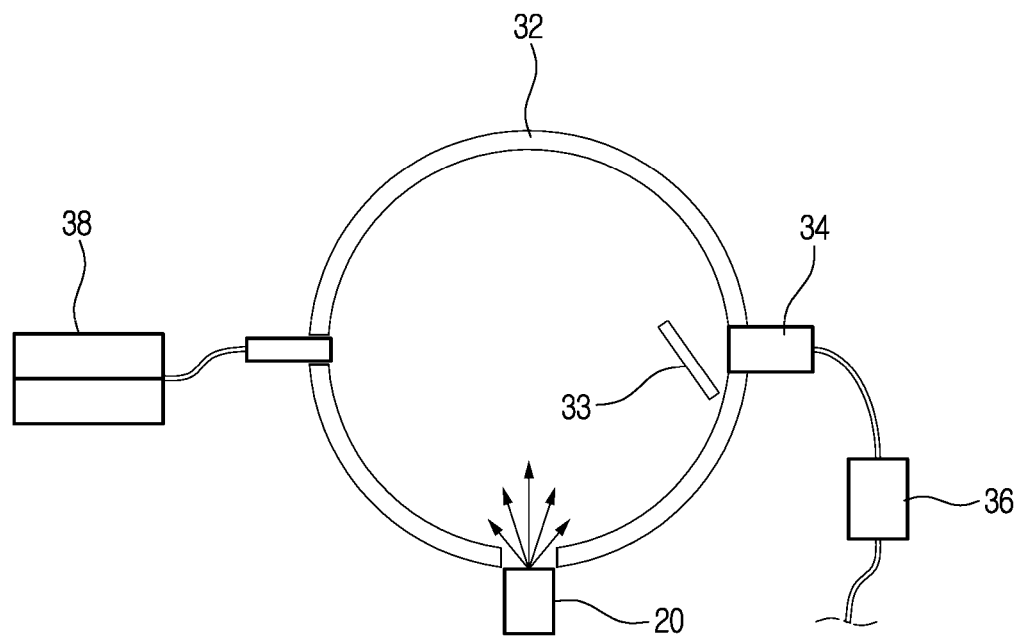
FIG. 3 illustrates another embodiment of a device for inspecting an optical power measurement of a light emitter according to the disclosure.

FIG. 2 illustrates an embodiment of a device for inspecting an optical power measurement of a light emitter according to the disclosure, and FIG. 3 illustrates another embodiment of a device for inspecting an optical power measurement of a light emitter according to the disclosure. The measurer 30 may for example include the configuration as shown in FIG. 2 or 3.

Referring to FIG. 2, the measurer 30 may include an integrating sphere 32, a photodiode detector 34, and a photocurrent or photovoltage measurement device 36.

The integrating sphere 32 is shaped like a hollow spherical cavity, the inner surface of which is coated with a highly reflective material, for example, barium sulfate, and is used as an auxiliary unit that helps to collect light emitted from the light emitter. When the integrating sphere is used in collecting light, a diffused reflection and a specular reflection may be all collected, or only the diffused reflection may be collected excluding the specular reflection. To collect only the diffused reflection, a baffle 33 or trap may be provided at a position where the specular reflection occurs. In the accompanying drawings, the baffle 33 is illustrated, but not limited thereto. As necessary, the baffle may be excluded. The integrating sphere includes an input port and an output port. The accompanying drawings illustrate that the inspection target light emitter 20 is disposed in the input port, and the photodiode detector 34 is disposed in the output port.

The photodiode detector 34 refers to an optical sensor that detects an optical signal and converts the optical signal into an electrical signal, and the photocurrent or photovoltage measurement device 36 refers to a device that measures the photocurrent or photovoltage of the electrical signal.

When the inspection target light emitter 20 is disposed in the input port of the integrating sphere 32 and light is emitted radially as shown in the accompanying drawings, the emitted light is diffused and reflected multiple times by the material applied to the inner surface of the integrating sphere, and is thus distributed uniformly. When the light uniformly distributed by the integrating sphere is incident on the photodiode detector 34, a current flows due to the photoelectric effect, and the photocurrent or photovoltage measurement device 36 outputs the current or voltage having a corresponding level. The detected and measured current or voltage may be transmitted to, but not limited to, a photometer (not shown) or the like through a cable.

As described above, the optical power of the inspection target light emitter needs to meet the safety standards for the eye protection, and the photodiode detector and the photocurrent or photovoltage measurement device are required to guarantee to operate correctly in order to accurately measure the optical power of the inspection target light emitter.

Similarly, referring to FIG. 3, the measurer 30 may further include a spectroradiometer 38 for more accurate measurement in addition to the integrating sphere 32, the photodiode detector 34, and the photocurrent or photovoltage measurement device 36. According to an alternative embodiment, the measurer 30 may include only the spectroradiometer 38 instead of the photodiode detector 34 and the photocurrent or photovoltage measurement device 36.

Here, repetitive descriptions about the integrating sphere, the photodiode detector, and the photocurrent or photovoltage measurement device will be avoided. However, the integrating sphere further includes an additional output port, and the accompanying drawing shows that the spectroradiometer 38 is disposed in the additional output port.

The spectroradiometer 38 refers to a light measurement tool that is able to measure both the wavelength and amplitude of the light emitted from a light source, and is capable of measuring the magnitudes of optical signals emitted from the light source according to wavelengths.

As shown in the accompanying drawings, when the inspection target light emitter 20 is disposed in the input port of the integrating sphere 32 and light is radially emitted from the inspection target light emitter 20, the emitted light is diffused and reflected multiple times by the material applied to the inner surface of the integrating sphere, and is thus distributed uniformly. When the light uniformly distributed by the integrating sphere is incident on the spectroradiometer 38, the full spectrum is obtained by discriminating the wavelength based on the incident position, and irradiance measurement for each wavelength is output.

As described above, the optical power of the inspection target light emitter needs to meet the safety standards for the eye protection, and spectroradiometer is required to guarantee to operate correctly in order to accurately measure the optical power of the inspection target light emitter.

To this end, the controller 40 measures the optical power of the inspection target light emitter, calculates an average of the optical power of the inspection target light emitter, and generates an alarm or warning to inhibit further use of the measurer being currently used when a difference between the calculated average and the optical power of the reference light emitter exceeds a predetermined first threshold.

Further, if necessary, the controller 40 measures the optical power of the inspection target light emitter, calculates a standard deviation of the optical power of the inspection target light emitter, and generates an alarm or warning to inhibit further use of the measurer being currently used when the calculated standard deviation exceeds a predetermined second threshold.

In this case, the average and standard deviation (if necessary) of the optical power of the inspection target light emitter are cumulatively calculated while a plurality of unspecified inspection target light emitters are sequentially measured for their optical power in an inspection stage before release, and the first threshold and the second threshold, which need to be high enough to inhibit the alarm from occurring unnecessarily and low enough to guarantee the safety standards, may be previously defined, for example, based on experiments according to the types and/or inspection conditions of the inspection target light emitters, and may be reset at any time as necessary. Further, actions after generating the alarm to stop using the measurer may for example include inspection of the measurer, reinitialization of photodiode detector calibration, and/or replacement with another reference light emitter.

When the difference between the calculated average and the optical power of the reference light emitter does not exceed the first threshold or the calculated standard deviation does not exceed the second threshold, the controller 40 may store the calculated average and/or standard deviation in a magnetic hard disk drive, a solid-stage drive (SSD) or the like nonvolatile memory.

As above, the identification using the first threshold and the second threshold to stop using the currently used measurer is based on the optical power of the reference light emitter. For more accurate identification, the optical power of the reference light emitter may be periodically or aperiodically measured in order to check whether the optical power is accurately repeated.

Figure 4:
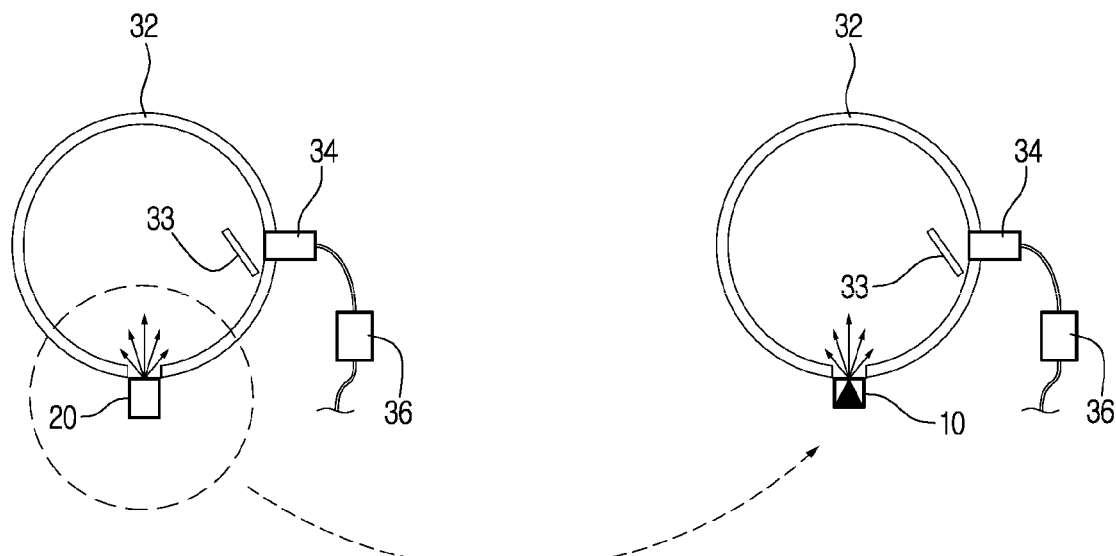
FIG. 4 shows an example of using a device for inspecting an optical power measurement of a light emitter according to the disclosure.

FIG. 4 shows an example of using a device for inspecting an optical power measurement of a light emitter according to the disclosure; and Referring to FIG. 4, as mentioned above, the optical power of the reference light emitter is measured periodically, in other words, in units of predetermined time, for example, every 4 hours or in units of a predetermined number of inspection target light emitters, for example, every 1,000 inspection target light emitters while the plurality of unspecified inspection target light emitters are sequentially measured for their optical power. Of course, the measurer for measuring the optical power of the inspection target light emitter is the same as that for measuring the optical power of the reference light emitter, and the position where the reference light emitter is disposed is exactly the same as that for the previous measurement.

Figure 5:
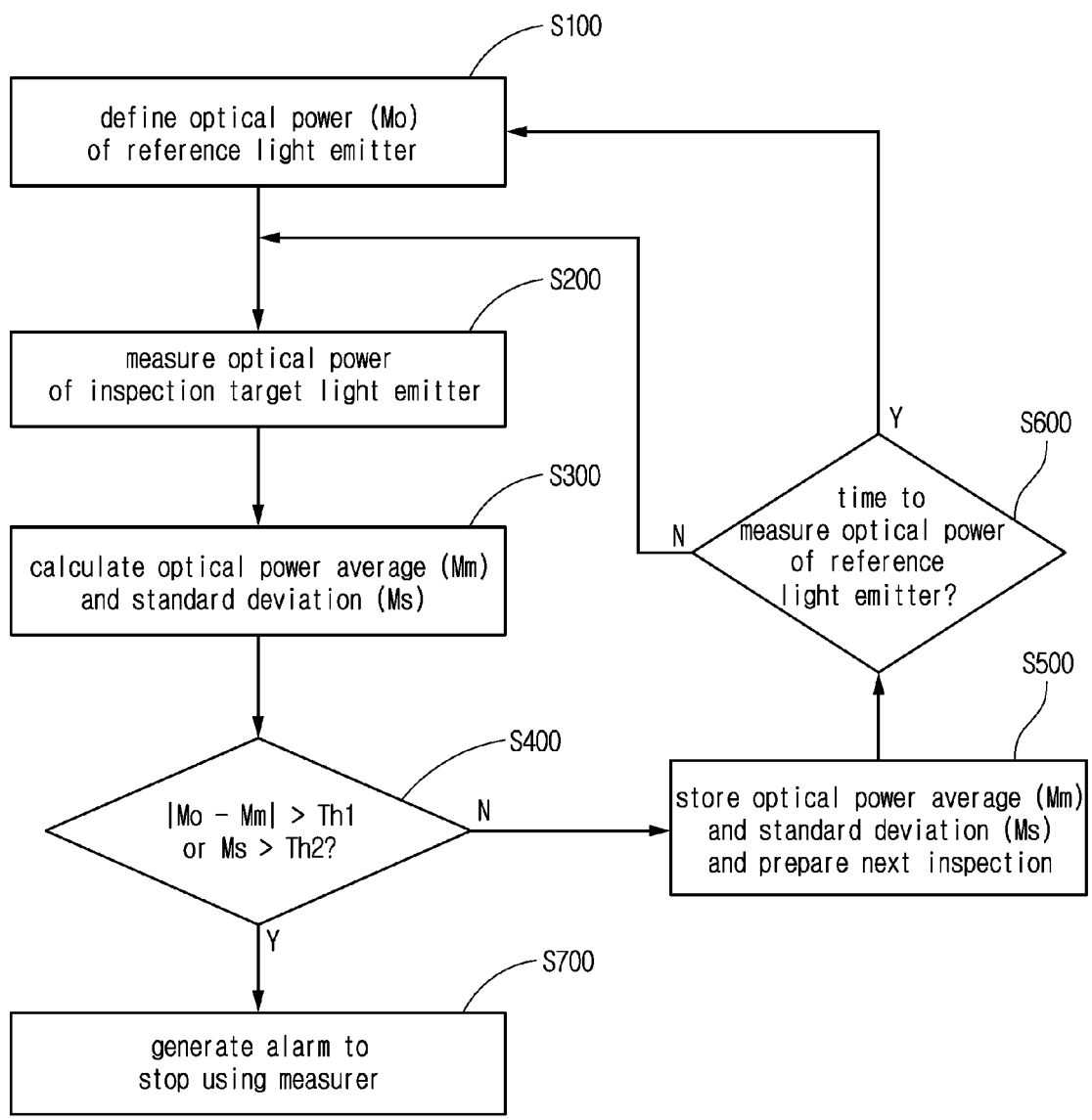
FIG. 5 is a flowchart showing a method of inspecting an optical power measurement of a light emitter according to the disclosure.

FIG. 5 is a flowchart showing a method of inspecting an optical power measurement of a light emitter according to the disclosure. Here, repetitive descriptions to those about the device for inspecting the optical power measurement of the light emitter according to the disclosure will be avoided.

Referring to FIG. 5, the method of inspecting the optical power measurement of the light emitter, which can be implemented in the device for inspecting the optical power measurement of the light emitter according to the disclosure, essentially includes the steps of: by the measurer, defining the optical power Mo of the reference light emitter (S100); by the measurer, measuring the optical power of the inspection target light emitter (S200); calculating an average Mm and if necessary, an standard deviation Ms of the optical power of the inspection target light emitter (S300); performing identification based on the power Mo, the average Mm, the standard deviation Ms (if any), a first threshold Th1, and a second threshold Th2 (S400); and generating an alarm to stop using the measurer according to the results of identification (S700).

Here, the step S100 of, by the measurer, defining the optical power Mo of the reference light emitter includes disposing the reference light emitter in the input port of the integrating sphere, and measuring the optical power of the reference light emitter.

The step S200 of, by the measurer, measuring the optical power of the inspection target light emitter includes measuring the optical power based on the photodiode detector and the photocurrent or photovoltage measurement device when the measurer includes the integrating sphere, the photodiode detector, and the photocurrent or photovoltage measurement device, or measuring the optical power based on the spectroradiometer when the measurer includes the integrating sphere and the spectroradiometer. Of course, the measurer includes the integrating sphere, the spectroradiometer, the photodiode detector, and the photocurrent or photovoltage measurement device, the step S200 may include both the two types of optical power measurement.

The step S400 of performing the identification based on the power Mo, the average Mm, the standard deviation Ms (if any), the first threshold Th1, and the second threshold Th2 includes identifying whether the difference between the average Mm of the optical power of the inspection target light emitter and the optical power Mo of the reference light emitter exceeds the first threshold Th1 or if necessary, whether the standard deviation Ms of the optical power of the inspection target light emitter exceeds the second threshold Th2. When the difference between the average Mm of the optical power of the inspection target light emitter and the optical power Mo of the reference light emitter exceeds the first threshold Th1 or when the standard deviation Ms of the optical power of the inspection target light emitter exceeds the second threshold Th2, the method enters the step S700 of generating the alarm to stop using the measurer. On the other hand, when the difference between the average Mm of the optical power of the inspection target light emitter and the optical power Mo of the reference light emitter does not exceed the first threshold Th1 and when the standard deviation Ms of the optical power of the inspection target light emitter does not exceed the second threshold Th2, the method enters the step of storing the average Mm and the standard deviation Ms in the nonvolatile memory and preparing the next inspection (S500). Herein, when the measurer includes the integrating sphere, the spectroradiometer, the photodiode detector and the photocurrent or photovoltage measurement device, both the two types of optical power identification may be performed. For example, when any one of the two types of optical power identification corresponds to the excess, it may be possible to enter the step of generating the alarm to stop using the measurer. Alternatively, when only one of the two types of optical power identification corresponds to the excess, the other type of optical power identification may be performed. Alternatively, when both the two types of optical power identification correspond to the excess, it may be possible to enter the step of generating the alarm to stop using the measurer.

In addition, the method may further include a step of checking whether it is time to measure the optical power of the reference light emitter before the next inspection (S600). When it is the time to measure the optical power of the reference light emitter, the step S100 of measuring the optical power of the reference light emitter is performed in the next inspection. When it is not the time to measure the optical power of the reference light emitter, the step S200 of measuring the optical power of the inspection target light emitter is performed in the next inspection.

As described above, a device and method for inspecting optical power measurement of a light emitter according to the disclosure have advantages that the inspection is more accurately and reliably performed.

Meanwhile, the device 1 for inspecting the power measurement of the light emitter according to the embodiments may have aspects that are entirely hardware, entirely software, or partially hardware and partially software. In the disclosure, the terms "-er", "unit," "module," "device," "system", or etc. are intended to refer to a combination of hardware and software run by the hardware. For example, the hardware may refer to a computing device capable of processing data, including a central processing unit (CPU), a graphic processing unit (GPU), or other processors. Further, the software may refer to a running process, an object, an executable file, a thread of execution, a program, etc.

Meanwhile, the methods according to embodiments of the disclosure may be at least partially implanted in the form of program instructions, and recorded in a computer readable recording medium. For example, the methods may be embodied with a program product having a computer readable medium including a program code, and may be implemented by a processor for carrying out any or all described steps, operations or processes.

The computer readable medium may include a program instruction, a data file, a data structure, etc. independently or combination thereof. The program instruction recorded in the medium may be specially designed or configured for embodiments, or publicly known and usable to a person having an ordinary kill in the computer software art. The computer readable recording medium may for example include magnetic media such as a hard disk, a floppy disk, and a magnetic tape; optical media such a CD-ROM, and a DVD; magneto-optical media such a floptical disk; and a ROM, RAM, a flash memory or the like hardware device specially configured to store and implement a program instruction. The program instruction may for example include not only a machine language code made by a compiler but also a high-level language code executable by a computer through an interpreter or the like. The hardware device may be configured to operate as one or more software module to perform an operation according to an embodiment, and vice versa.

As above, with the device and method for inspecting the optical power measurement of the light emitter according to the disclosure, the inspection is more accurately and reliably performed by on the periodic optical power measurement using the reference light emitter, thereby providing a light emitter that is safe for a human body.

The terms used in this disclosure are generally intended as "open" terms in particular in claims (e.g., the bodies of the claims) (for example, "including" needs to be construed as meaning "including without limitations," "having" needs to be construed as meaning "at least having", and "comprising" needs to be construed as meaning "comprising without limitations." When a specific number is intentionally given in claims, the intention is explicitly described in the claims. On the other hand, no explicit description is construed as absence of the intention.

Although only certain features of the disclosure are illustrated and described above, various modifications and changes can be made by those skilled in the art. Therefore, it will be appreciated that claims are intended to include the changes and modifications within the scope of the disclosure.

What is claimed is:

1. A device for inspecting optical power measurement of a light emitter, the device comprising:
 a reference light emitter;
 a measurer configured to measure optical power by receiving light emitted from one of the reference light emitter and a plurality of inspection target light emitters, the measurer comprising an integrating sphere, a photodiode detector, and a photocurrent or photovoltage measurement device; and
 a controller configured to calculate a first average of optical power of the plurality of inspection target light emitters by measuring first optical power of a first inspection target light emitter among the plurality of inspection target light emitters, and generate an alarm to stop using the measurer when a difference between the first average of optical power and a second optical power of the reference light emitter exceeds a first threshold, and
 wherein the second optical power of the reference light emitter is periodically measured and stored while the plurality of inspection target light emitters are sequentially measured for their optical power, and
 wherein an action after generating the alarm to stop using the measurer includes an inspection of the measurer, a reinitialization of the photodiode detector calibration, and a replacement with another reference light emitter.

2. The device of claim 1, wherein each of the plurality of inspection target light emitters comprises a laser, a light emitting diode (LED) or a halogen lamp.

3. The device of claim 2, wherein the controller is configured to calculate a first standard deviation of optical power of the plurality of inspection target light emitters by measuring first optical power of a first inspection target light emitter among the plurality of inspection target light emitters, and generate an alarm to stop using the measurer when the first standard deviation of optical power exceeds a second threshold.

4. The device of claim 3, wherein, when the difference between the first average of optical power and the second optical power of the reference light emitter does not exceed the first threshold, or when the first standard deviation of optical power does not exceed the second threshold, the first average of optical power and the first standard deviation of optical power are stored in a nonvolatile memory.

5. A method of inspecting optical power measurement of a light emitter, implementable in a device for inspecting optical power measurement of the light emitter, the method comprising the steps of:
 (a) by a measurer, defining a second optical power of a reference light emitter;
 (b) by the measurer, measuring first optical power of a first inspection target light emitter among a plurality of inspection target light emitters; and
 (c) calculating a first average of optical power of the plurality of inspection target light emitters, and generating an alarm to stop using the measurer when a difference between the first average of optical power and the second optical power of the reference light emitter exceeds a first threshold, and
 wherein the second optical power of the reference light emitter is periodically measured and stored while the plurality of inspection target light emitters are sequentially measured for their optical power, and
 wherein an action after generating the alarm to stop using the measurer includes an inspection of the measurer, a reinitialization of the photodiode detector calibration, and a replacement with another reference light emitter.

6. The method of claim 5, wherein each of the plurality of inspection target light emitters comprises a laser, a light emitting diode (LED) or halogen lamp.

7. The method of claim 6, further comprising (d) calculating a first standard deviation of optical power of the plurality of inspection target light emitters, and generating an alarm to stop using the measurer when the first standard deviation of optical power exceeds a second threshold.

8. The method of claim 7, further comprising storing the first average of optical power and the first standard deviation of optical power in a nonvolatile memory when the difference between the first average of optical power and the second optical power of the reference light emitter does not exceed the first threshold or when the first standard deviation of optical power does not exceed the second threshold.

9. The method of claim 8, wherein the measurer comprises an integrating sphere, a photodiode detector, and a photocurrent or photovoltage measurement device, or comprises the integrating sphere and a spectroradiometer, or comprises the integrating sphere, the spectroradiometer, the photodiode detector, and the photocurrent or photovoltage measurement device.

10. The method of claim 9, wherein the step of (a) by a measurer, defining the optical power of the reference light emitter comprises measuring the optical power of the reference light emitter by disposing the reference light emitter in an input port of the integrating sphere.

11. A non-transitory computer readable medium having stored therein program instructions executable by a computing system to cause the computing system to perform the method according to claim 5.

* * * * *